(12) United States Patent
Bryzek et al.

(10) Patent No.: US 10,835,030 B2
(45) Date of Patent: Nov. 17, 2020

(54) INDIVIDUAL-PATIENT ONE-DAY ORAL CARE KIT

(71) Applicant: Medline Industries, Inc., Northfield, IL (US)

(72) Inventors: Joseph Bryzek, Kenosha, WI (US); Sharbel J. Maalouf, Pleasant Prairie, WI (US); Angela Zuick, Northlake, IL (US)

(73) Assignee: Medline Industries, Inc., Northfield, IL (US)

( * ) Notice: Subject to any disclaimer, the term of this patent is extended or adjusted under 35 U.S.C. 154(b) by 579 days.

(21) Appl. No.: 15/618,781

(22) Filed: Jun. 9, 2017

(65) Prior Publication Data

US 2018/0352948 A1     Dec. 13, 2018

(51) Int. Cl.
   *A46B 15/00*          (2006.01)
   *B65D 75/00*          (2006.01)
   *B65D 77/04*          (2006.01)
   *B65D 75/52*          (2006.01)
   *A61C 17/08*          (2006.01)
   (Continued)

(52) U.S. Cl.
   CPC ...... *A46B 15/0091* (2013.01); *A46B 15/0093* (2013.01); *A61C 17/005* (2013.01); *A61C 17/08* (2019.05); *B65D 33/2508* (2013.01); *B65D 75/008* (2013.01); *B65D 75/327* (2013.01); *B65D 75/522* (2013.01); *B65D 77/0406* (2013.01); *B65D 77/38* (2013.01); *A46B 15/0053* (2013.01); *A46B 2200/1066* (2013.01); *A46B 2200/1073* (2013.01); *B65D 2575/3245* (2013.01); *B65D 2577/042* (2013.01); *B65D 2577/043* (2013.01)

(58) Field of Classification Search
CPC . A46B 15/0053; A46B 15/0091; A61C 17/08; B65D 75/008; B65D 75/522; B65D 2577/042
See application file for complete search history.

(56) References Cited

U.S. PATENT DOCUMENTS

D202,743 S     11/1965   Schneidner
3,456,866 A *   7/1969   Civitello ................ B65D 31/12
                                                    383/40

(Continued)

OTHER PUBLICATIONS

"Continue Care™ Oral Cleansing and Suctioning Systems, Now with Corinz™ Oral Antiseptic and Moisturizer", Sage® Products brochure 22573 from www.sageproducts.com; publicly available at least as early as Dec. 31, 2016; 2 pages.

(Continued)

*Primary Examiner* — Nicholas D Lucchesi
(74) *Attorney, Agent, or Firm* — Fitch, Even, Tabin & Flannery LLP (57) ABSTRACT

An individual-patient one-day oral care kit comprises a housing and a plurality of sealed trays disposed within the housing. Each of the sealed trays contains oral hygiene components. By one approach at least one of the sealed trays contains an oral hygiene component comprising a toothbrush that is unique to that particular tray. By one approach all of the sealed trays contain at least one same oral hygiene component. By one approach each of the sealed trays is configured to serve a patient's oral hygiene compliance requirements in accordance with an event driven schedule during a single day.

20 Claims, 9 Drawing Sheets

(51) Int. Cl.
  *B65D 33/25* (2006.01)
  *A61C 17/00* (2006.01)
  *B65D 75/32* (2006.01)
  *B65D 77/38* (2006.01)

(56) References Cited

U.S. PATENT DOCUMENTS

| | | | |
|---|---|---|---|
| 4,433,783 A | 2/1984 | Dickinson | |
| D310,641 S | 9/1990 | Miller | |
| D355,593 S | 2/1995 | Bell | |
| 5,709,866 A * | 1/1998 | Booras | A45C 11/008 424/400 |
| 6,341,688 B1 * | 1/2002 | Graham | A45D 44/20 134/201 |
| D470,757 S | 2/2003 | Espinel | |
| D504,745 S | 5/2005 | Leech | |
| 7,048,120 B2 | 5/2006 | Pond | |
| 7,424,952 B2 | 9/2008 | Antler | |
| D580,749 S | 11/2008 | Miller | |
| D580,788 S | 11/2008 | Scholefield | |
| 7,617,828 B1 * | 11/2009 | Sinha | A46B 5/0075 132/286 |
| D628,904 S | 12/2010 | Josephs | |
| D644,120 S | 8/2011 | Kight | |
| D656,841 S | 4/2012 | Echavarria | |
| 8,302,776 B2 * | 11/2012 | Lien | B65D 81/3261 206/370 |
| D677,576 S | 3/2013 | Gridley | |
| D701,125 S | 3/2014 | Propper | |
| 8,763,796 B2 | 7/2014 | Grossman | |
| 8,789,701 B2 * | 7/2014 | Hohlbein | A46B 11/0003 206/572 |
| D727,750 S | 4/2015 | Murphy | |
| D734,169 S | 7/2015 | Harper | |
| D740,132 S | 10/2015 | Lestage | |
| D749,427 S | 2/2016 | Sorbatti | |
| 9,332,827 B2 | 5/2016 | Lee | |
| D767,406 S | 9/2016 | Kennedy | |
| 9,492,006 B2 * | 11/2016 | Jimenez | A46B 11/0065 |
| D785,449 S | 5/2017 | Cataudella | |
| D813,028 S | 3/2018 | Saito | |
| 10,327,539 B2 * | 6/2019 | Beck | B08B 1/002 |
| 2005/0205439 A1 * | 9/2005 | Stafford | A61J 7/04 206/232 |
| 2005/0269219 A1 * | 12/2005 | Discko, Jr. | A61M 35/003 206/219 |
| 2006/0042992 A1 * | 3/2006 | Vulcano | A45C 5/03 206/581 |
| 2006/0124506 A1 | 6/2006 | Fuchs | |
| 2011/0151404 A1 * | 6/2011 | Dombrowski | A46B 15/00 433/96 |
| 2011/0151405 A1 * | 6/2011 | Dombrowski | A61M 1/008 433/96 |
| 2013/0276815 A1 * | 10/2013 | Hohlbein | A46B 11/0003 132/310 |
| 2014/0021070 A1 | 1/2014 | Le | |
| 2016/0045293 A1 * | 2/2016 | Sagel | A61C 19/066 433/216 |
| 2017/0258217 A1 * | 9/2017 | Zachar | A61C 17/26 |
| 2017/0311707 A1 * | 11/2017 | Beck | B08B 1/002 |
| 2017/0347790 A1 * | 12/2017 | Zachar | A46B 9/026 |
| 2018/0256430 A1 | 9/2018 | Zachar | |

OTHER PUBLICATIONS

"New & Improved Sage Covered Yankauer with Suction Control, and Suction Handle", Sage® Products brochure 23566 from www.sageproducts.com; publicly available at least as early as Dec. 31, 2016; 2 pages.

"Oral Hygiene, Q Care® Oral Cleansing & Suctioning Systems and Toothette® Oral Care", Sage® Products brochure of 20300Q from www.sageproducts.com; publicly available at least as early as Dec. 31, 2016; 22 pages.

"Sage Q Care® Oral Cleansing and Suctioning Systems, Now with Corinz™ Antiseptic Cleansing & Moisturizer Oral Rinse", Sage® Products; brochure 23567 from www.sageproducts.com; publicly available at least as early as Dec. 31, 2016; 2 pages.

"Understanding the Clinical Significance of Non-Ventilator Hospital-Acquired Pneumonia (NV-HAP)", Sage® Products brochure 23501 from www.sageproducts.com; publicly available at least as early as Dec. 31, 2016; 2 pages.

"Product Catalog", Sage® Products brochure 22894B from www.sageproducts.com; publicly available at least as early as Dec. 31, 2016; 12 pages.

"24-Hour Oral Care Bags," Medline product currently available at https://www.medline.com/product/24-Hour-Oral-Care-Bags/Single-Use-Oral-Care-Kits/Z05-PF140468?question=oral+care+kit&index=P12&indexCount=12; publicly available at least as early as May 2017; 1 page.

"24-Hr. Oral Care Kits," Medline product currently available at https://www.medline.com/product/24-Hr-Oral-Care-Kits/Single-Use-Oral-Care-Kits/Z05-PF96429?guestion=oral+care+kit&index=P1&indexCount=1; publicly available at least as early as May 2017; 2 pages.

"24-Hr. Oral Care Kits with CHG & Mouth Rinse," Medline product currently available at https://www.medline.com/product/24-Hr-Oral-Care-Kits-with-CHG-Mouth-Rinse/Suction/Z05-PF06349?question=oral+care+kit&index=P2&indexCount=2; publicly available at least as early as May 2017; 2 pages.

"24-Hr. Oral Care Kits with CHG and Hydrogen Peroxide," Medline product currently available at https://www.medline.com/product/24-Hr-Oral-Care-Kits-with-CHG-and-Hydrogen-Peroxide/Suction/Z05-PF06351?guestion=oral+care+kit&index=P4&indexCount=4; publicly available at least as early as May 2017; 2 pages.

* cited by examiner

INDIVIDUAL-PATIENT ONE-DAY ORAL CARE KIT

TECHNICAL FIELD

These teachings relate generally to oral care and more particularly to the administration of oral care in an institutional care setting.

BACKGROUND

Patients are only occasionally admitted to an institutional care setting as a primary result of improper oral care. Unfortunately, however, it is relatively common for patients in an institutional care setting to develop a disease such as non-ventilator hospital-acquired pneumonia due to a lack of proper oral care while within the institution. Studies have shown that within 48 hours of admission patients can experience changes in oral bacteria including the proliferation of the virulent gram-negative organisms that can be micro-aspirated. Such diseases can greatly extend the patient's stay at the institution, can greatly increase the cost of their stay, and can significantly increase mortality rates as well.

The basics of proper oral care, of course, are well known. The applicant has determined, however, that timely compliance with a proper oral care regimen can be difficult to achieve in the busy and sometimes confusing environment of an institutional care facility. In particular, it can be difficult to encourage compliance and also difficult to measure compliance.

BRIEF DESCRIPTION OF THE DRAWINGS

The above needs are at least partially met through provision of the individual-patient one-day oral care kits described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments an individual-patient one-day oral care kit comprises a housing and a plurality of sealed trays disposed within the housing. Each of the sealed trays contains oral hygiene components. By one approach at least one of the sealed trays contains an oral hygiene component comprising a toothbrush that is unique to that particular tray. By one approach all of the sealed trays contain at least one same oral hygiene component. By one approach each of the sealed trays is configured to serve a patient's oral hygiene compliance requirements in accordance with an event driven schedule during a single day.

By one approach the aforementioned housing is wholly comprised of flexible material and may comprise, for example, a plastic bag. By one approach the plastic bag has a bottom that includes gases formed therein such that the plastic bag is self-supporting in a vertical orientation when resting upon a flat surface.

For ease of access, by one approach the plastic bag has at least one horizontal terror line formed there in at the top of the plastic bag such that a user opens the plastic bag by hand tearing the plastic bag beginning at horizontal terror line. If desired the plastic bag further includes a zip lock feature formed therein at the top of the plastic bag between the bottom of the plastic bag and the at least one horizontal terror line. So configured, the plastic bag can be reclosed after opening the plastic bag via the horizontal terror line.

By one approach a front side of the plastic bag comprises a transparent window through which a substantial part of the contents are readily viewed. If desired, the housing further includes instructions disposed thereon for using the oral hygiene components contained therein per a compliance regimen.

The aforementioned event driven schedule can comprise for daily events. By one approach these for the events constitute breakfast, lunch, dinner, and pre-bedtime preparation.

The specific contents of the individual-patient one-day oral care kit can vary with particular needs as desired. By one approach, for example, the individual-patient one-day oral care kit is configured as a self-care kit. By another approach, the individual-patient one-day oral care kit is configured as an assistant-care kit. As yet they another example in these regards, the individual-patient one-day oral care kit can be configured as a denture-care kit.

By one approach the kid further includes a compliance-tracking card disposed therein. The compliance-tracking card and include a user-ascertainable reference to each of the trigger events corresponding to the compliance regimen and further provide a user interface (such as an unchecked checkbox) by which a user can indicate usage of the oral hygiene components that correspond to a particular one of the four events to thereby form a daily compliance record.

So configured, such an individual-patient one-day oral care kit is well suited for use in an institutional-care setting such as a hospital, nursing home, or the like. So configured, oral care regimen compliance is both readily accomplished and assured over the course of a day even as caregiver staff changes over time.

These and other benefits may become clearer upon making a thorough review and study of the following detailed description.

Figure 1:
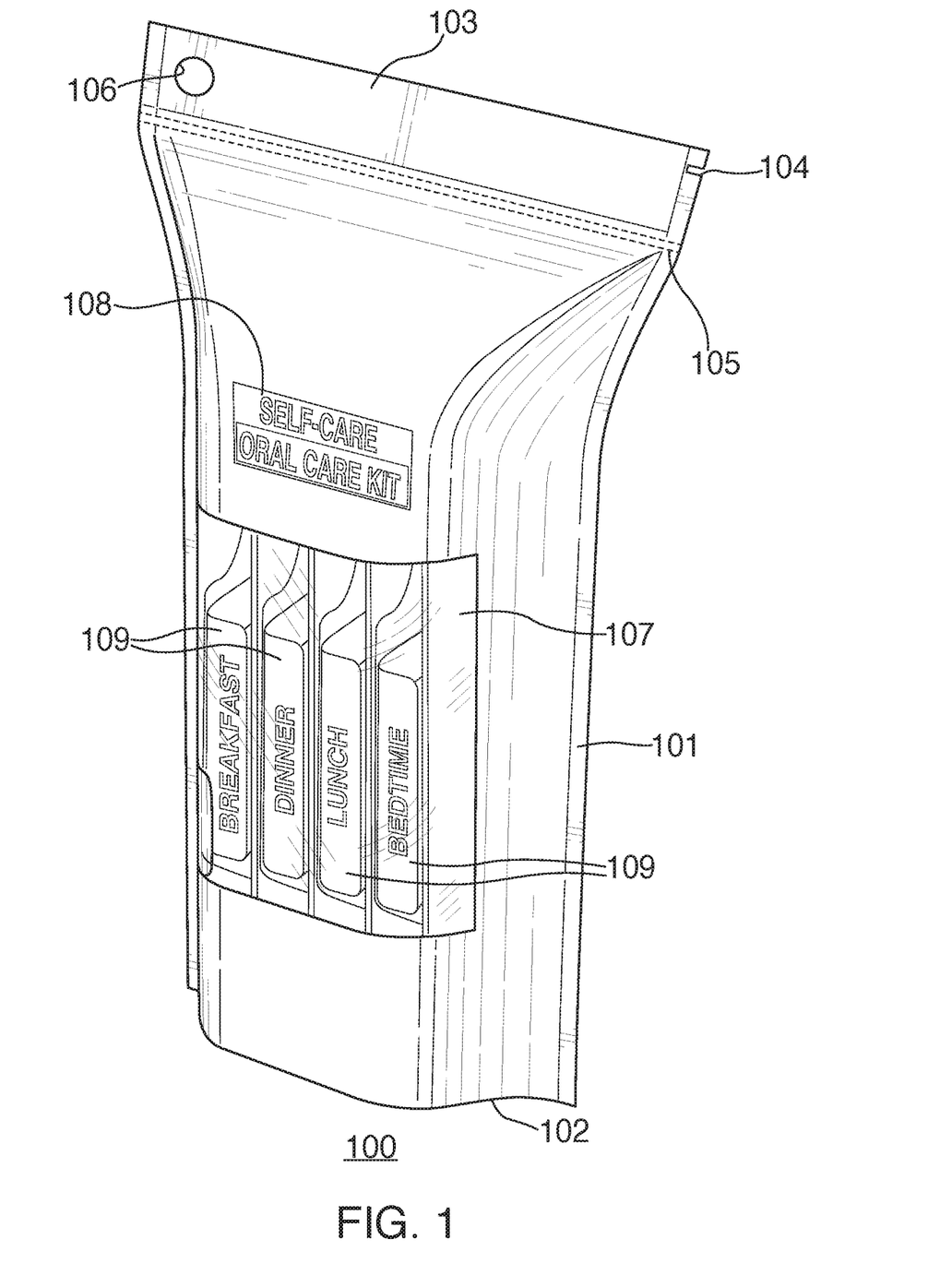
FIG. 1 comprises a front elevational view as configured in accordance with various embodiments of these teachings.
Figure 2:
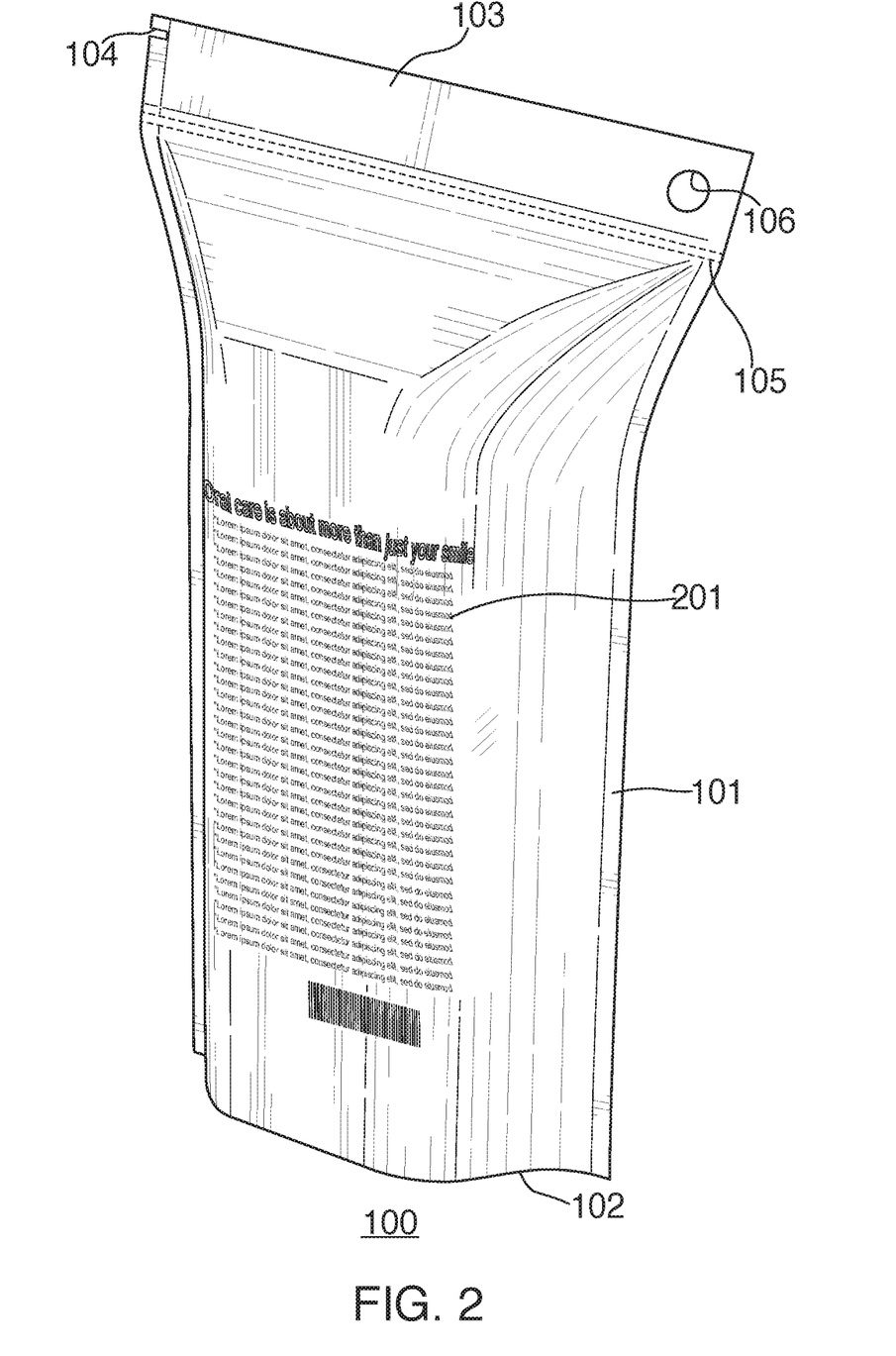
FIG. 2 comprises a rear elevational view as configured in accordance with various embodiments of these teachings.

FIGS. 1 and 2 present the front and back side of an illustrative example of an individual-patient one-day oral care kit 100. The reference to "individual patient" will be understood to mean that the kit and its contents are intended and distributed for use by a single person only. The reference to "one day" will be understood to mean a single calendar day that begins in the morning and concludes that same evening.

This kit 100 is wholly self-contained within a corresponding housing 101. In this example the housing 101 is wholly comprised of flexible material such as a pliable plastic and can comprise, as illustrated, a plastic bag. In this illustrative example the bottom 102 of the housing 101 includes gussets formed therein such that the plastic bag is self-supporting in a vertical orientation when resting upon a flat surface such as a tabletop, countertop, or the like.

The top side 103 of the housing 101 has at least one horizontal tear line formed therein comprising a notch 104 formed at the edge of the housing 101 (in this case, the word "horizontal" referring to an orientation that is parallel to the bottom of the housing 101). So configured, a user can conveniently open the plastic bag by tearing the plastic bag beginning at this horizontal tear line. The width and depth of this notch 104 can be varied as appropriate to suit the relative strength of the plastic that comprises the housing 101 and/or the anticipated gripping strength of the user. In many application settings it will not be necessary for the entire top edge of the housing 101 to be fully removed in order to provide convenient and adequate access to the contents thereof. If desired, this tear line can further include scoring and/or perforations in the plastic material to further assist and guide such tearing.

FIGS. 1 and 2 also illustrate that the top 103 of the housing 101 can further include a zip lock feature 105 formed therein between the bottom 102 of the plastic bag and the horizontal tear line such that the plastic bag can be reclosed after opening the plastic bag via the horizontal tear line. These figures further illustrate that the top 103 of the housing 101 can include a hole 106 formed therethrough to facilitate hanging the housing 101 from a hook (not shown) if desired.

By one approach, and as shown in FIG. 1, the housing 101 can have a window 107 formed on one side thereof such as the front side. Such a window 107 can comprise a clear (or relatively clearer) part of the plastic material that comprises the housing 101. Properly located and sized, such a window 107 can permit the caregiver and/or the user to readily view the contents of the housing 101 to thereby quickly ascertain, for example, whether administration of the kit contents are generally up-to-date without needing to open the housing 101.

If desired, the housing 101 can include indicium 108 formed thereon to identify a particular type of oral care kit. As an illustrative example, in FIG. 1 this indicium 108 identifies the oral care kit as being a self-care oral care kit. Also if desired, and as shown in FIG. 2, the housing 101 can include informational content 201 formed thereon (in this case, on the back side of the housing 101). This informational content 201 can include instructions regarding proper use of the kit and its contents, usage cautions, regimen specifics and requirements, ingredients, and so forth as desired.

As shown in FIG. 1, the housing 101 has a plurality of sealed trays 109 disposed therein. In this particular example there is one sealed tray 109 for each of a plurality of event driven schedule triggers that comprise the daily compliance regimen served by the kit 100. In this illustrative example the four events that comprise the event driven schedule are breakfast, lunch, dinner, and pre-bedtime preparation.

Figure 3:
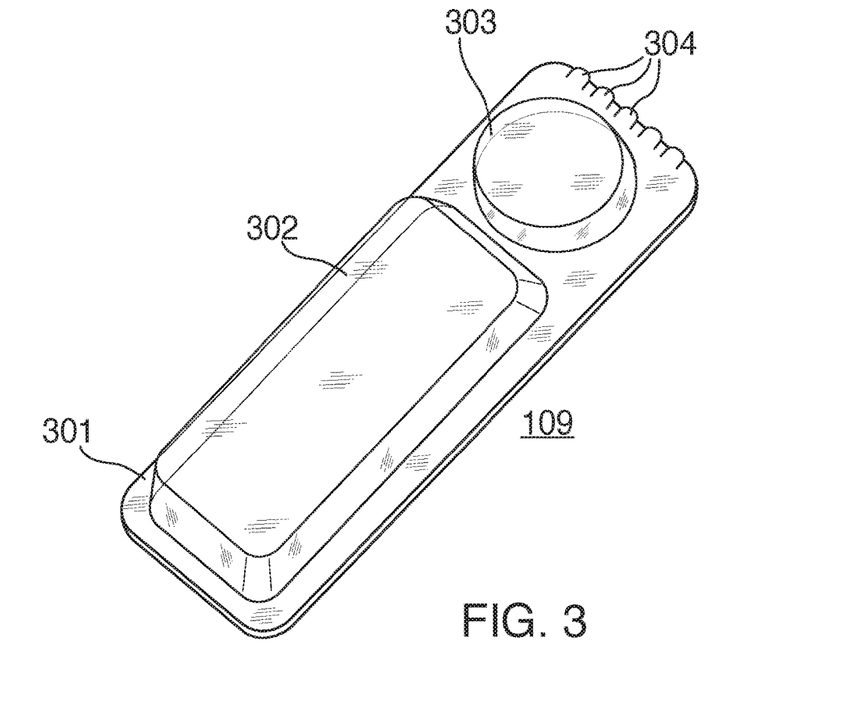
FIG. 3 comprises a bottom perspective view as configured in accordance with various embodiments of these teachings.
Figure 4:
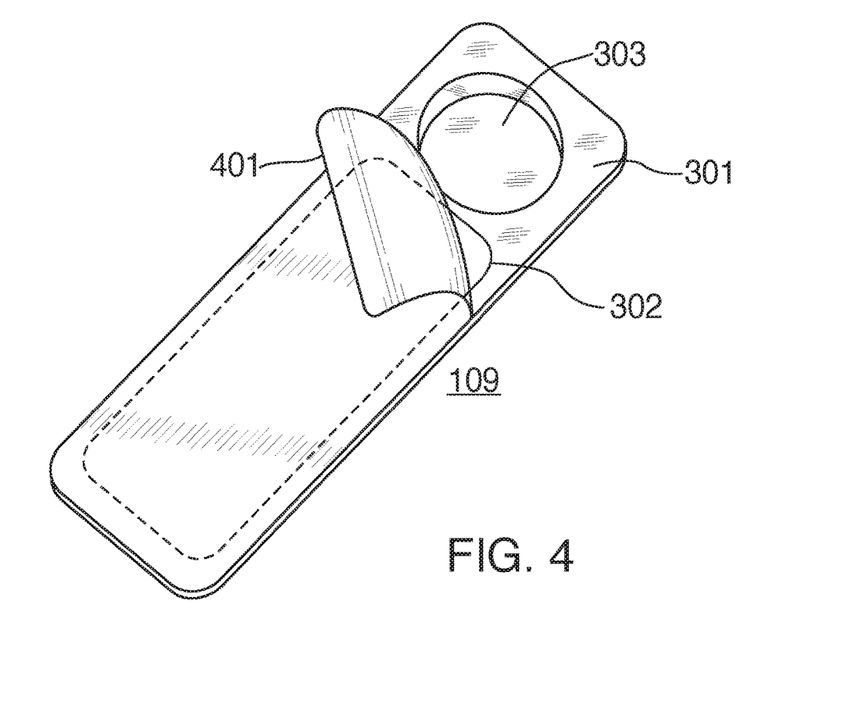
FIG. 4 comprises a top perspective view as configured in accordance with various embodiments of these teachings.

Referring to FIGS. 3 and 4, by one approach each of the sealed trays 109 can be identical or essentially identical to one another (though the contents of each may be as similar or as different as may be appropriate to the application setting). In this example each of the sealed trays has a body 301 formed of plastic (for example, via a blow molding process). In this example each tray body 301 has two separated compartments. A first compartment 302 serves to contain oral hygiene components while the second compartment 303 can serve as a well or cup for holding an oral hygiene liquid during use as described herein. (In this particular example the liquid-holding compartment 303 is empty until the user places a liquid within the compartment 303 during use.) The relative sizes and shapes of these two compartments 302 and 303 can be selected as desired to suit the needs of a given application setting. In this illustrative example the component-holding compartment 302 is considerably larger than the liquid-holding compartment 303.

If desired, and as shown in FIG. 3, the tray body 301 can include corrugations 304 formed along one or more edge thereof to provide strength to the tray body 301 edge.

As shown in FIG. 4 the sealed tray 109 can further include a removable cover 401. This cover 401 can be comprised of paper, plastic film, foil, or the like as desired and can be secured to the tray body 301 using, for example, an appropriate adhesive, heat sealing technique, or the like. This cover 401 serves to preserve the cleanliness of the liquid-receiving compartment 303 and to retain oral hygiene components within the first compartment 302 pending use.

If desired, this cover 401 can have instructions or other informational content disposed thereon to explain use of the oral hygiene components contained within the sealed tray 109 per a particular compliance regimen that corresponds to the kit 100. These instructions may be partially or wholly similar/redundant from one sealed tray 109 to the next in a given kit 100 as appropriate. These instructions may also be partially or wholly similar/redundant to any instructions that are provided on the housing 101 as described above and as desired.

As noted above, each of the sealed trays 109 can correspond to a particular event per an event driven schedule trigger-based usage of the kit 100. In that case, one or more of the sealed trays 109 can each include event indicium disposed thereon/therein to identify a corresponding event driven schedule trigger. For example, one of the sealed trays 109 can be labeled as corresponding to the "breakfast" trigger, another of the sealed trays 109 can be labeled as corresponding to the "lunch" trigger, yet another of the sealed trays 109 can be labeled as corresponding to the "dinner" trigger, and yet another of the sealed trays 109 can be labeled as corresponding to the "pre-bedtime preparation" trigger. By one approach this event indicium can be placed on a paper or cardboard insert that is placed inside the oral hygiene component compartment 302.

By one approach the various sealed trays 109 as corresponds to a particular kit 100 are placed within the housing 101 in an intended order of use as per the compliance regimen. For example, when viewed from the front, the leftmost sealed tray 109 can correspond to the breakfast trigger, with the lunch trigger tray, the dinner trigger tray, and the pre-bedtime preparation trigger tray being disposed in order of intended use to the right.

As mentioned above, the kit 100 shown in FIGS. 1 and 2 comprises a self-care oral care kit. Accordingly, this kit is intended for use with a patient in an institutional-care setting who is capable of administering their own oral care. A caregiver can place the kit 100 in an appropriate place where the patient can see and use the kit 100 during the course of the day. The patient's use of the kit 100 can be readily monitored by noting the contents of the kit 100 at any given time and also by noting the used or unused state of each of the sealed trays 109.

Figure 5:
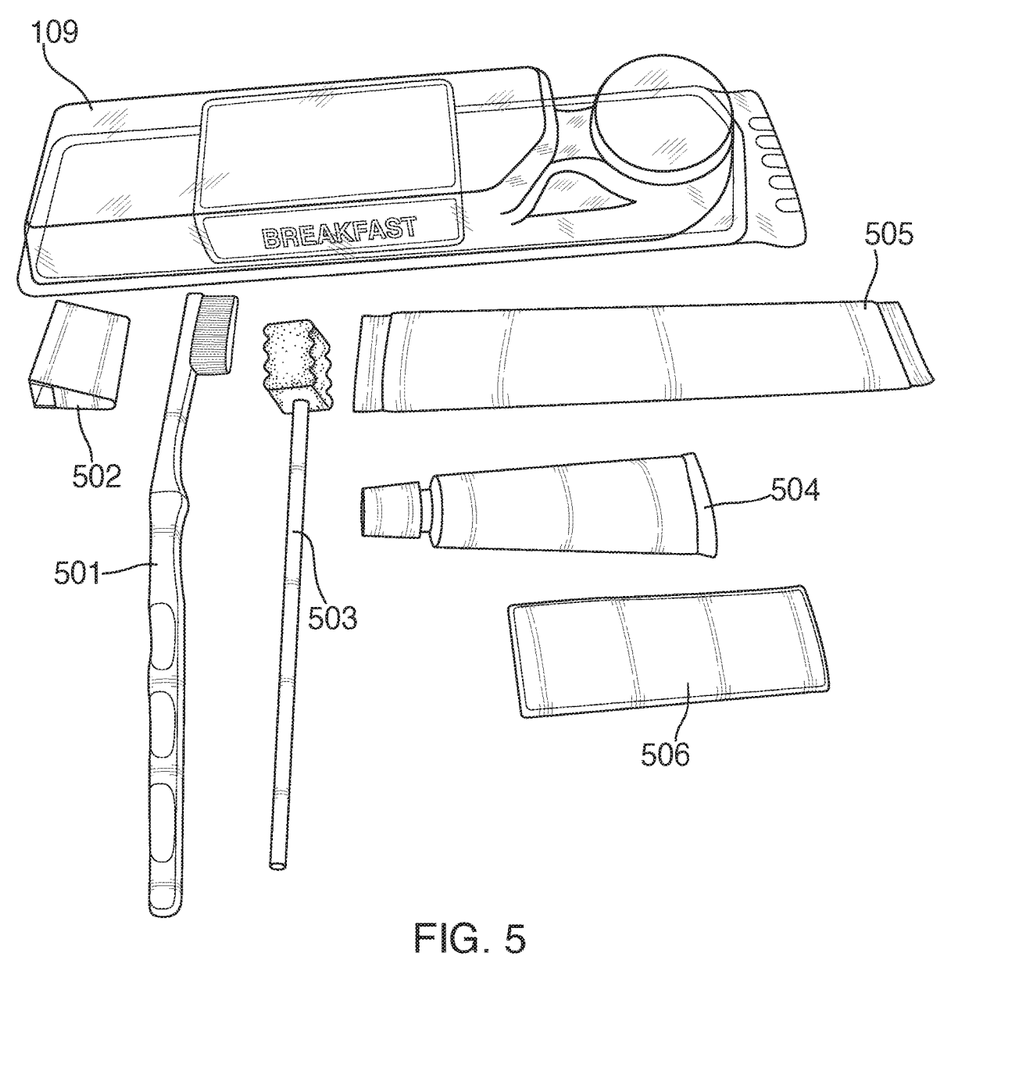
FIG. 5 comprises a top perspective view as configured in accordance with various embodiments of these teachings.

Continuing with this particular example of a self-care care kit, the "breakfast" sealed tray 109 can include, as shown at FIG. 5, a toothbrush 501 (such as a so-called super soft toothbrush), a toothbrush cover 502 to protect the toothbrush bristles in between uses, an oral swab 503 (such as a Dentips oral swab), a small tube of toothpaste 504 (such as a plaque-removing toothpaste), an oral rinse packet 505 (such as an alcohol-free oral rinse), and a packet of mouth moisturizer 506 (to be administered via the aforementioned oral swab, for example). The aforementioned liquids can, in turn, be directly deposited in the patient's mouth or placed into the liquids container 302 to facilitate use as appropriate. So configured, the patient has what they need to properly attend to their oral hygiene following breakfast.

The aforementioned toothbrush 501, toothbrush cover 502, and toothpaste 504 can be retained for subsequent use that same day while the remaining oral hygiene components can be disposed of following use. Also, if desired and in the alternative to the foregoing, the reusable items (i.e., in this example, the toothbrush 501, the toothbrush cover 502, and the toothpaste 504) may be provided in a separate "open first" tray 109 or can be placed loosely in the housing 101 for ready use in conjunction with the contents of the remaining trays 109.

Figure 6:
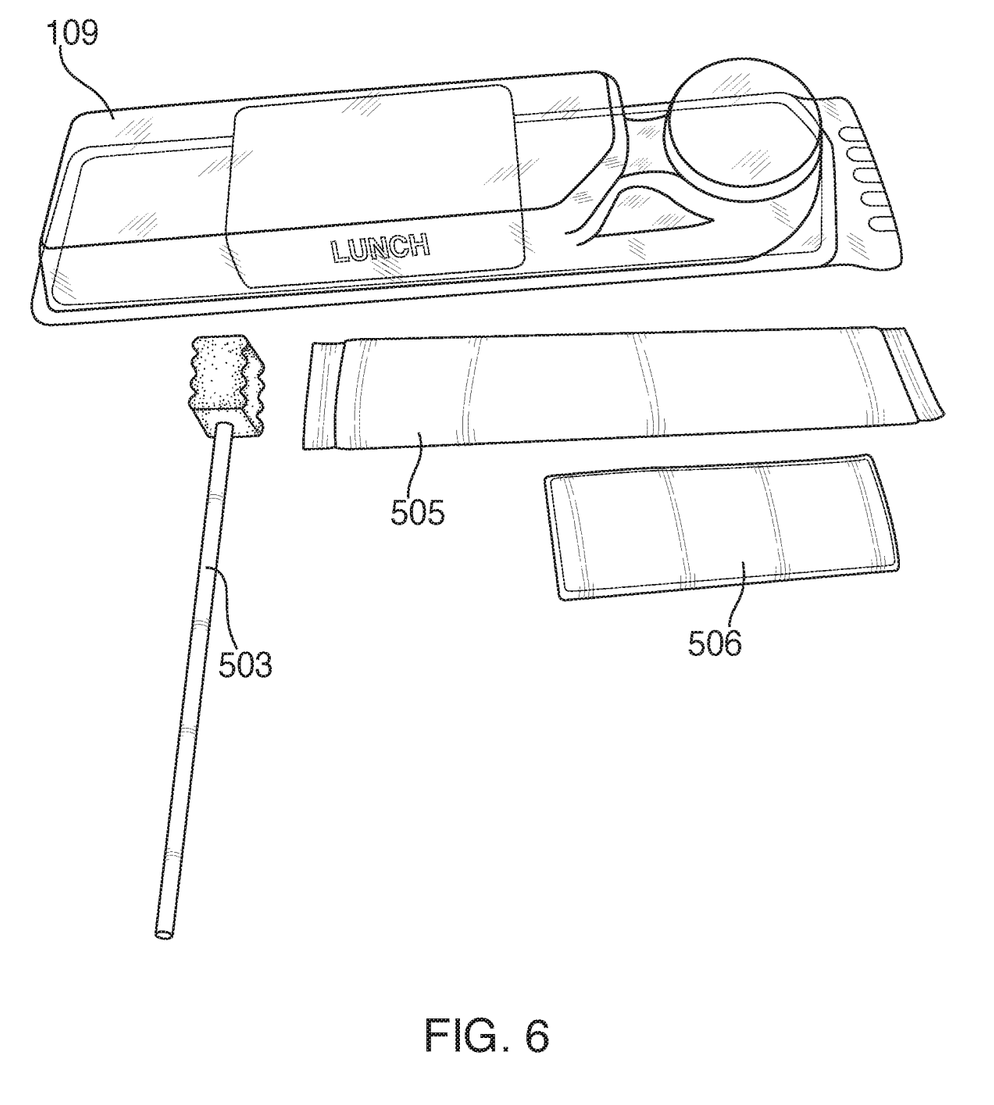
FIG. 6 comprises a top perspective view as configured in accordance with various embodiments of these teachings.

The remaining three sealed trays 109 for the self-care oral care kit can be as shown in FIG. 6. Accordingly, the sealed tray for each of the lunch, dinner, and pre-bedtime preparation events can include an oral swab 503, an oral rinse packet 505, and a packet of mouth moisturizer 506. So configured, each of the sealed trays 109 (some in combination with reusable components from the initial tray) is configured to serve a patient's oral hygiene compliance requirements per a corresponding event driven schedule during a single day.

Figure 7:
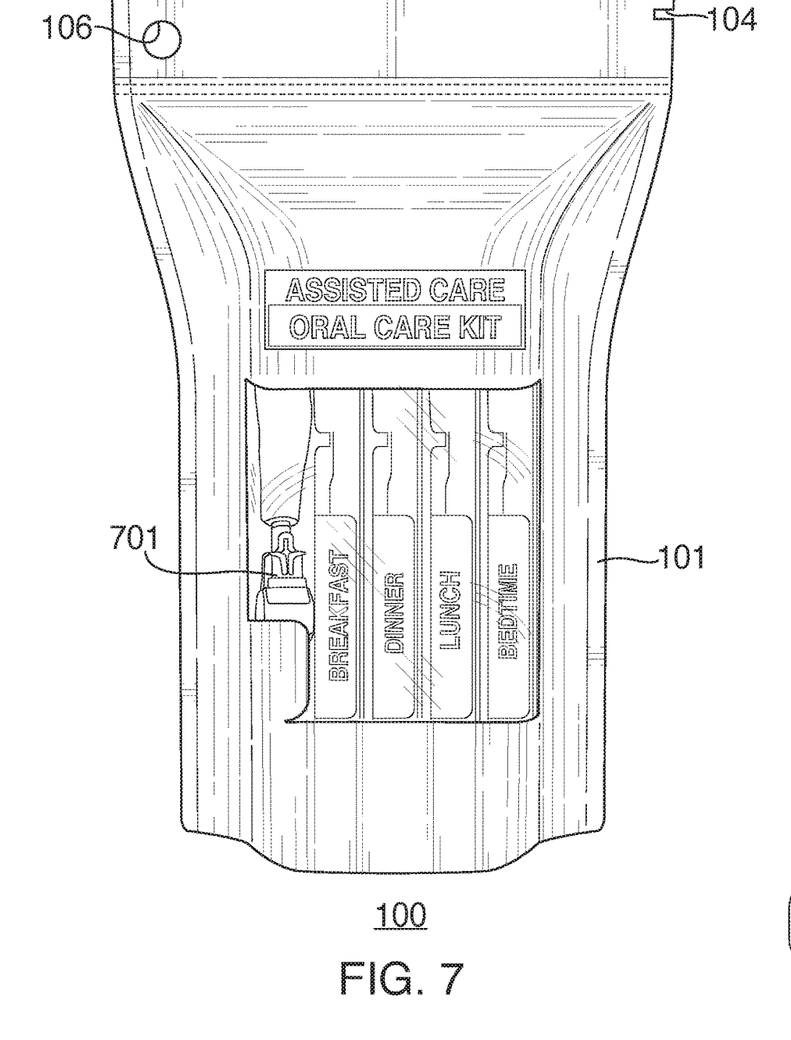
FIG. 7 comprises a front elevational view as configured in accordance with various embodiments of the invention.
Figure 8:
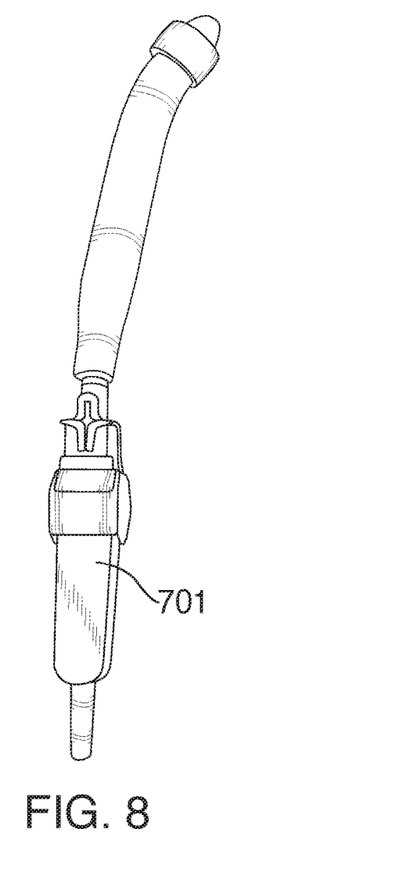
FIG. 8 comprises a top plan view configured in accordance with various embodiments of these teachings.

As noted above these teachings will accommodate configuring the kit 100 as an assisted-care oral care kit. Such a kit can be used with a patient who needs at least some help with their oral hygiene. In this case, in addition to four event-based sealed trays 109, the kit 100 also includes a Yankauer 701 disposed within the housing 101. A Yankauer (shown in more detail in FIG. 8) comprises an oral suctioning tool used in medical procedures. It is typically a firm plastic suction tip with a large opening surrounded by a bulbous head and is designed to allow effective suction without damaging surrounding tissue.

Figure 9:
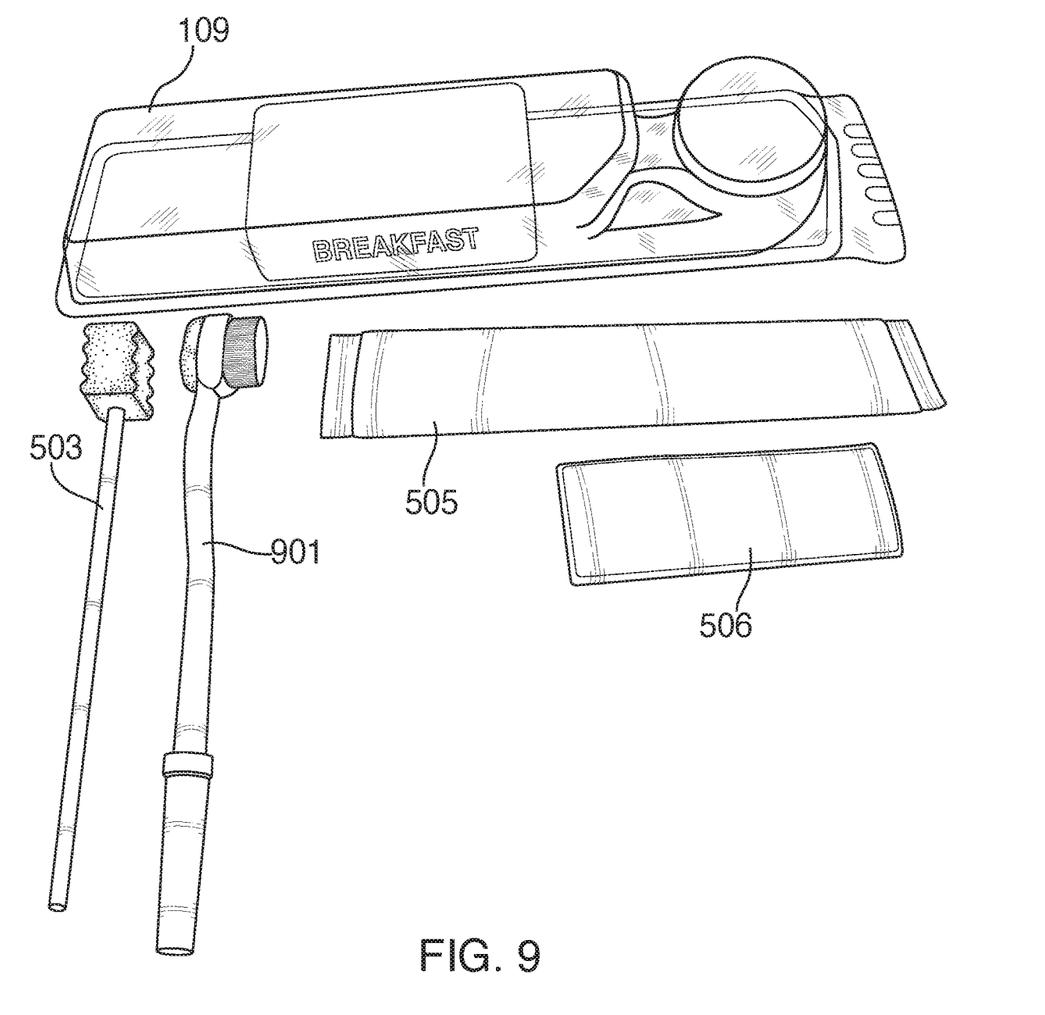
FIG. 9 comprises a top perspective view as configured in accordance with various embodiments of the invention.

The first-used sealed tray 109 (in this case corresponding to the breakfast event) includes an oral swab 503, an oral rinse packet 505, and a packet of mouth moisturizer 506 as described above. In addition, in this assisted-care oral care kit the first sealed tray 109 also includes a suction toothbrush 901. This suction toothbrush 901 is configured to be compatibly coupled to the Yankauer 701 and used in combination with suction while attending to the patient's oral hygiene. The remaining sealed trays 109 of the assisted care oral care kit can be as described above with respect to FIG. 6 (where reuse that day of the suction toothbrush 901 and Yankauer 701 is anticipated).

Figure 10:
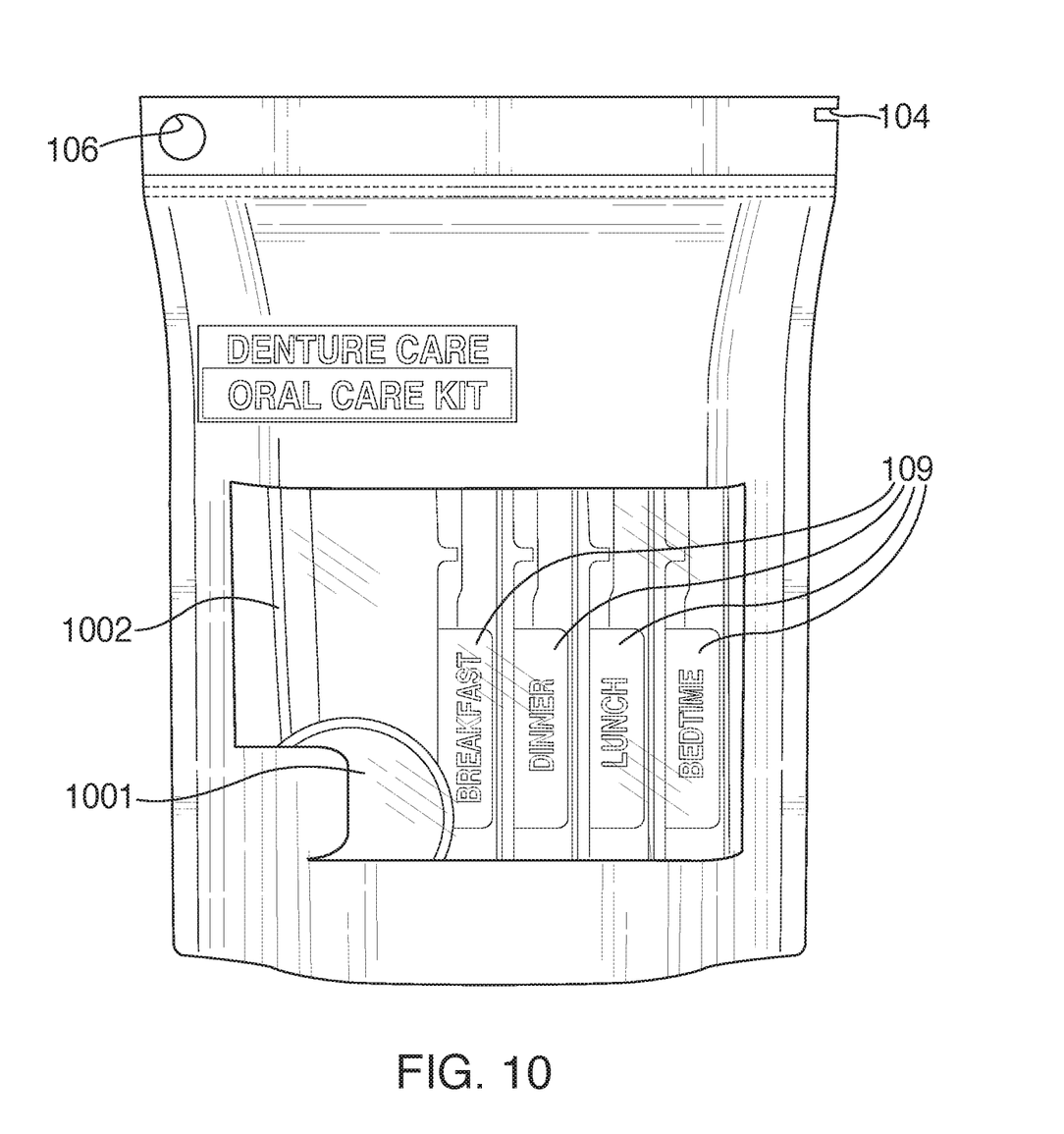
FIG. 10 comprises a top perspective view as configured in accordance with various embodiments of these teachings.

These teachings will also accommodate configuring such a kit 100 to serve as a denture care oral care kit. FIG. 10 presents an illustrative example in these regards. In such a case the first-used sealed tray 109 (such as the breakfast event tray) can include a toothbrush and cover as described above along with an oral rinse and an oral swab. The remaining sealed trays 109 can each include a packet of oral rinse and an oral swab. In addition to the sealed trays 109, the denture care oral care kit can include a denture cup 1001 configured and sized to receive the patient's dentures therein, a denture cleaner, and a denture adhesive 1002.

Figure 11:
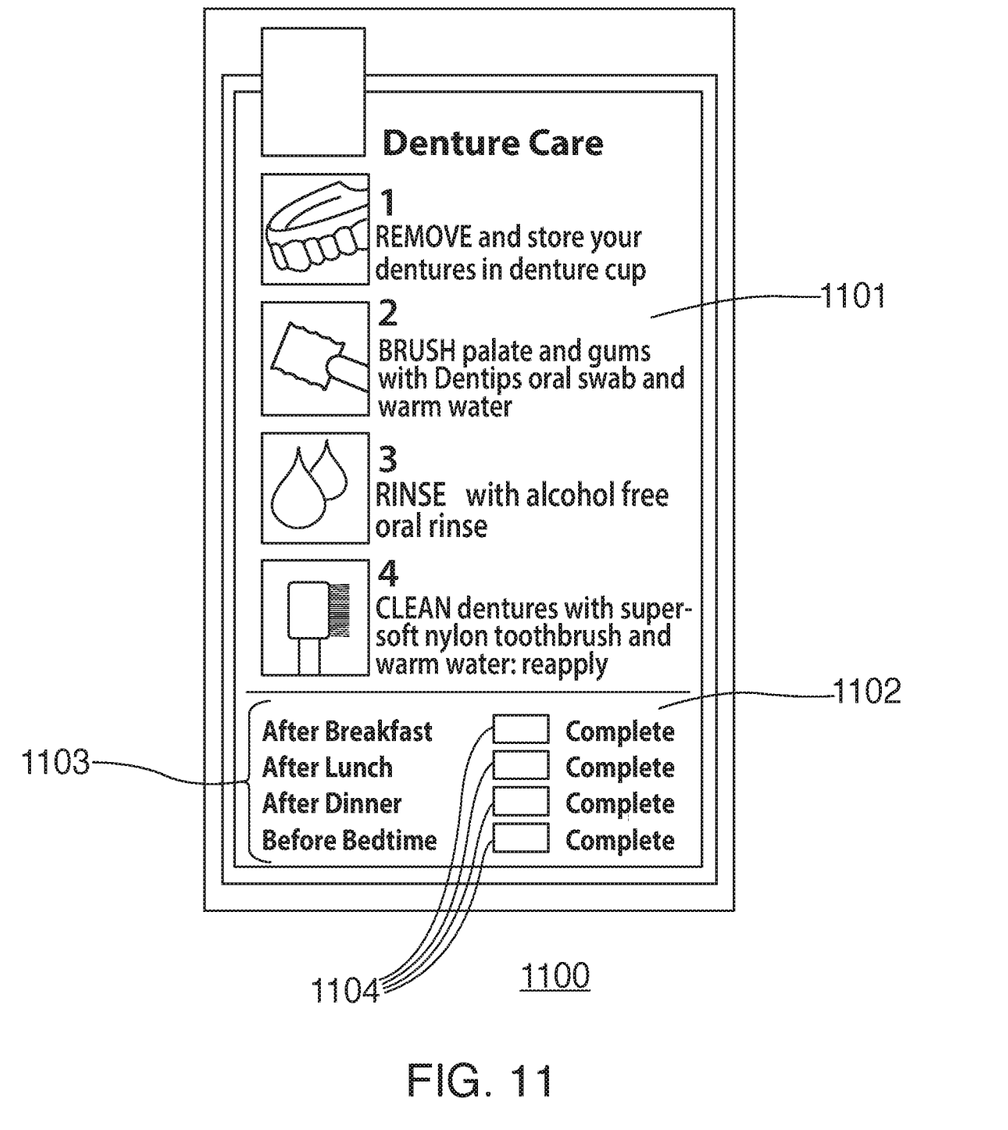
FIG. 11 comprises a top plan view as configured in accordance with various embodiments of these teachings.

By one approach, and as shown in FIG. 11, such kits can further include a compliance-tracking card 1100 that is disposed, for example, within the housing 101. This card 1100 can be comprised of any suitable material including paper, plastic, plastic-laminated paperboard, and so forth as desired. A first area 1101 of the card 1100 can provide simple instructions (expressed via text, images, or both as desired) regarding the use of the various components contained in the kit.

A second area 1102 of the card 1100 can include user-ascertainable references 1103 to each of the aforementioned four events. In this example these references 1103 comprise the words "After Breakfast," "After Lunch," "After Dinner," and "Before Bedtime." Adjacent each of these references 1103 is a user interface (in this example, unchecked checkboxes 1104) by which the user (i.e., the patient for a self-care kit or the caregiver for assisted-care kits) can indicate usage of the oral hygiene components that correspond to the appropriate one of the four events. (If desired, the kit can include a small pen or pencil to be used to check these checkboxes.) So configured, the card 1100 forms a simple, efficient, and reliable daily compliance record regarding the patient's oral hygiene.

In this example the text on the card 1100 employs English. Other languages can of course be accommodated. These teachings will also accommodate duplicating the contents of this side of the card 1100 on the backside of the card, albeit as translated into another language (such as Spanish or French) to accommodate multi-language application settings and/or international use. These teachings will also accommodate presenting the text using an alternative modality such as brail.

The above-described patient-centered kits can readily accommodate different patients having different care requirements. Such kits can also assure that premium and appropriate oral care components are being used to help ensure infection prevention and patient comfort in an institutional care application setting. These kits will readily accommodate including instructions and other informational content to help ensure patient education and/or proper usage and compliance. The compliance recordation approaches disclosed herein can provide an important mechanism for documenting oral hygiene compliance. And those skilled in the art will appreciate the great convenience represented by the described approaches.

Those skilled in the art will recognize that a wide variety of modifications, alterations, and combinations can be made with respect to the above described embodiments without departing from the scope of the invention. For example, individual kits can be sized and configured to suit adults or children separately (such that child-appropriate kits provide a smaller-sized toothbrush, for example). Accordingly, such modifications, alterations, and combinations are to be viewed as being within the ambit of the inventive concept.

What is claimed is:

1. An individual-patient one-day oral care kit comprising:
a housing;
a plurality of sealed trays disposed within the housing, each of the sealed trays containing oral hygiene components and wherein at least one of the sealed trays contains an oral hygiene component comprising a toothbrush that is unique to that particular tray and wherein all of the sealed trays contain at least one same oral hygiene component, each of the sealed trays being configured to serve a patient's oral hygiene compliance requirements per an event driven schedule during a single day.

2. The individual-patient one-day oral care kit of claim 1 wherein the housing is wholly comprised of flexible material.

3. The individual-patient one-day oral care kit of claim 2 wherein the housing comprises a plastic bag.

4. The individual-patient one-day oral care kit of claim 3 wherein the plastic bag has a bottom that includes gussets formed therein such that the plastic bag is self-supporting in a vertical orientation when resting upon a flat surface.

5. The individual-patient one-day oral care kit of claim 4 wherein the plastic bag has at least one horizontal tear line formed therein at the top of the plastic bag such that a user opens the plastic bag by tearing the plastic bag beginning at the horizontal tear line.

6. The individual-patient one-day oral care kit of claim 5 wherein the plastic bag further includes a zip lock feature formed therein at the top of the plastic bag between the bottom of the plastic bag and the at least one horizontal tear line such that the plastic bag can be re-closed after opening the plastic bag via the horizontal tear line.

7. The individual-patient one-day oral care kit of claim 1 wherein each of the sealed trays is formed of plastic.

8. The individual-patient one-day oral care kit of claim 1 wherein the housing includes instructions disposed thereon for using the oral hygiene components per a compliance regimen and wherein each of the sealed trays includes instructions disposed thereon for using the oral hygiene components wherein the instructions included on the sealed trays are at least partially redundant with the instructions provided on the housing.

9. The individual-patient one-day oral care kit of claim 1 wherein the individual-patient one-day oral care kit is configured as a self-care kit and wherein the at least one sealed tray that includes the toothbrush further includes toothpaste.

10. The individual-patient one-day oral care kit of claim 9 wherein the at least one sealed tray that further includes the toothbrush further includes oral hygiene components comprising oral rinse packets, mouth moisturizer packets, and oral swabs.

11. The individual-patient one-day oral care kit of claim 1 wherein the individual-patient one-day oral care kit is configured as an assisted-care kit and wherein the toothbrush comprises a suction toothbrush.

12. The individual-patient one-day oral care kit of claim 11 further comprising:
a Yankauer disposed within the housing.

13. The individual-patient one-day oral care kit of claim 12 wherein the sealed trays further include oral hygiene components comprising oral rinse packets, mouth moisturizer packets, and oral swabs.

14. The individual-patient one-day oral care kit of claim 1 wherein the individual-patient one-day oral care kit is configured as a denture-care kit and wherein the individual-patient one-day oral care kit further comprises at least one of a denture cup, a denture cleaner, and a denture adhesive disposed within the housing.

15. The individual-patient one-day oral care kit of claim 14 wherein the individual-patient one-day oral care kit comprises each of a denture cup, a denture cleaner, and a denture adhesive disposed within the housing.

16. The individual-patient one-day oral care kit of claim 1 wherein each of the sealed trays includes event indicium disposed thereon that identifies which event of the event driven schedule triggers use of each of the sealed trays.

17. The individual-patient one-day oral care kit of claim 16 wherein there are four events that comprise the event driven schedule.

18. The individual-patient one-day oral care kit of claim 17 wherein the four events constitute breakfast, lunch, dinner, and pre-bedtime preparation.

19. The individual-patient one-day oral care kit of claim 17 further comprising:
a compliance-tracking card disposed within the housing, the compliance-tracking card including a user-ascertainable reference to each of the four events and providing a user interface by which a user can indicate usage of an oral hygiene component that corresponds to a particular one of the four events to thereby form a daily compliance record.

20. The individual-patient one-day oral care kit of claim 19 wherein the user interface comprises an unchecked checkbox.

* * * * *